US009405345B2

(12) United States Patent
Ananthakrishnan et al.

(10) Patent No.: US 9,405,345 B2
(45) Date of Patent: Aug. 2, 2016

(54) CONSTRAINING PROCESSOR OPERATION BASED ON POWER ENVELOPE INFORMATION

(71) Applicant: Intel Corporation, Santa Clara, CA (US)

(72) Inventors: Avinash N. Ananthakrishnan, Portland, OR (US); Stephen H. Gunther, Beaverton, OR (US); Jeremy J. Shrall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 14/039,193

(22) Filed: Sep. 27, 2013

(65) Prior Publication Data
US 2015/0095666 A1    Apr. 2, 2015

(51) Int. Cl.
G06F 1/00 (2006.01)
G06F 1/32 (2006.01)
G06F 1/20 (2006.01)
G06F 11/30 (2006.01)
G06F 1/26 (2006.01)

(52) U.S. Cl.
CPC ............. *G06F 1/3206* (2013.01); *G06F 1/206* (2013.01); *G06F 1/26* (2013.01); *G06F 1/3203* (2013.01); *G06F 1/324* (2013.01); *G06F 1/3212* (2013.01); *G06F 11/3024* (2013.01); *G06F 11/3058* (2013.01); *Y02B 60/1217* (2013.01); *Y02B 60/1292* (2013.01)

(58) Field of Classification Search
CPC ..... G06F 1/3203; G06F 1/3296; G06F 1/206; G06F 1/26; G06F 1/3206; G06F 2201/86; G06F 11/3024; G06F 11/3058
See application file for complete search history.

(56) References Cited

U.S. PATENT DOCUMENTS

| | | | |
|---|---|---|---|
| 5,163,153 | A | 11/1992 | Cole et al. |
| 5,522,087 | A | 5/1996 | Hsiang |
| 5,590,341 | A | 12/1996 | Matter |
| 5,621,250 | A | 4/1997 | Kim |
| 5,931,950 | A | 8/1999 | Hsu |

(Continued)

FOREIGN PATENT DOCUMENTS

EP    1 282 030 A1    5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Thomas Lee
*Assistant Examiner* — Zhipeng Wang
(74) *Attorney, Agent, or Firm* — Trop, Pruner & Hu, P.C.

(57) ABSTRACT

In an embodiment, a processor includes at least one core to execute instructions and a power controller coupled to the core. The power controller may include a power envelope control logic to receive a plurality of power envelope parameters and to enable a power consumption level of the processor to exceed a power burst threshold for a portion of a time window. This portion may be determined according to a length of the time window and a duty cycle, where the power envelope parameters are programmed for a system including the processor and include the power burst threshold, the time window, and the duty cycle. Other embodiments are described and claimed.

16 Claims, 10 Drawing Sheets

(56) References Cited

U.S. PATENT DOCUMENTS

| | | | |
|---|---|---|---|
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 8,924,752 B1* | 12/2014 | Law et al. | 713/322 |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh et al. | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0049133 A1* | 3/2007 | Conroy | G06F 1/26 439/894 |
| 2007/0050647 A1* | 3/2007 | Conroy et al. | 713/300 |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2009/0006871 A1 | 1/2009 | Liu et al. | |
| 2009/0119523 A1* | 5/2009 | Totten | 713/322 |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115293 A1* | 5/2010 | Rotem | G06F 1/206 713/300 |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0154090 A1 | 6/2011 | Dixon et al. | |
| 2011/0301889 A1 | 12/2011 | Naffziger et al. | |
| 2011/0314305 A1* | 12/2011 | De Cesare | G06F 1/3203 713/300 |
| 2012/0079290 A1 | 3/2012 | Kumar | |
| 2012/0144215 A1* | 6/2012 | Naffziger | G06F 1/26 713/320 |
| 2012/0246506 A1 | 9/2012 | Knight | |
| 2012/0331321 A1* | 12/2012 | Kaburlasos | G06F 1/3228 713/323 |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2013/0328890 A1* | 12/2013 | Avkarogullari et al. | 345/501 |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benin!, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/600,568, filed Aug. 31, 2012, entitled, "Configuring Power Management Functionality in a Processor," by Malini K. Bhandaru, et al.

International Searching Authority, "Notification of Transmittal of the International Search Report and the Written Opinion of the International Searching Authority," mailed Apr. 20, 2015, in International application No. PCT/14186558.4.

* cited by examiner

CONSTRAINING PROCESSOR OPERATION BASED ON POWER ENVELOPE INFORMATION

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

Also, current and future processors are being targeted for ever-shrinking form factors, such that processors conventionally designed for larger computer systems such as servers, desktops, and laptops are targeted for incorporation into tablet computers, electronic readers, smartphones, personal digital assistants and so forth. In these small form factor devices, a processor is expected to provide the same level of performance and responsiveness as in a traditional larger form factor device. However, due to form factor limitations, the size and capability of power delivery components of the device such as inductors, amount of decoupling capacitors, battery, and adapter/power supply become severely constrained. For a processor to attain a higher performance level or provide increased responsiveness, it consumes greater current as it bursts to a high power level for short durations of time. However, bursting to higher power levels places increased stress on the downstream power delivery components. Due to form factor limitations in smaller form factor devices, the downstream power delivery components cannot sustain long periods of high power residency or frequent bursts to these high power levels, and thus a conflict exists between responsiveness and platform capabilities.

DETAILED DESCRIPTION

Figure 1:
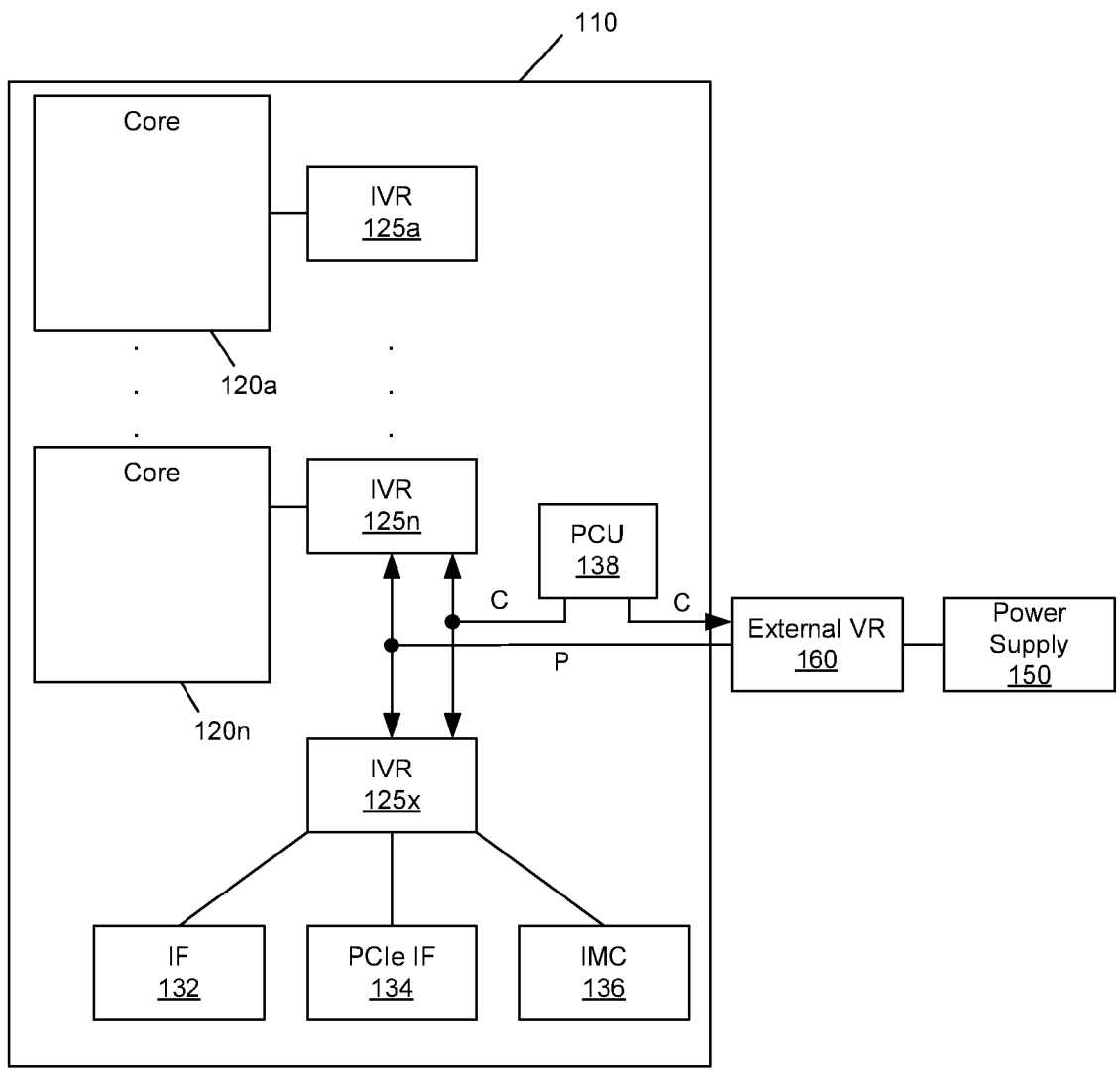
FIG. 1 is a block diagram of a portion of a system in accordance with an embodiment of the present invention.

In various embodiments a technique is provided to control the duration of time for which a processor can burst to higher power levels that stress power delivery components and how frequently such bursts can occur. This control is provided, as power delivery components (particularly in small form factor devices) cannot handle repeated and frequent bursts to higher power levels. Using an embodiment of the present invention, a platform designer (such as an original equipment manufacturer (OEM)) is provided with the ability to specify an operating power envelope and to constrain the processor to always operate within that power envelope.

In an embodiment, a processor is prevented, using power envelope information and techniques described herein, from exceeding a given power consumption level. Understand of course that a given processor may be configured with a variety of different power consumption levels or thresholds. At a high level, a processor is configured with a maximum current consumption, IccMax, corresponding to an electrical design point (EDP) which is a power level that the processor is not allowed to exceed for any duration of time, to maintain electrical safety of the processor. When a processor is configured to be unconstrained according to the power envelope techniques described herein, a processor may be allowed to operate up to this EDP value.

In addition to this EDP value, a processor is typically configured with other power consumption thresholds, including a thermal design point (TDP) which is a long term threshold at which a processor is allowed to safely operate. In one example embodiment, the TDP corresponds to a threshold referred to herein as PL1. The processor may also be configured with another power consumption threshold above this TDP value, namely a PL2 value, which is often configured to exceed the TDP by approximately 25-40%. The processor may be allowed to operate at PL2 level for short durations of time (e.g., on the order of seconds).

Using embodiments as described herein, yet another power consumption threshold, referred to herein as a burst power threshold or PL3, is defined. When a processor is constrained using an embodiment of the power envelope techniques described herein, the processor is permitted to exceed this PL3 level (such exceeding is referred to herein as a "burst") for only a threshold number of bursts over a given time window. At such point, the processor is limited to operate at a peak power level less than this PL3 level (and potentially no greater than a safe power level less than the PL3 level, described further below) for the duration of the time window.

This is so, as a platform's power delivery components can only sustain power levels above this PL3 level for short durations of limited frequency.

For purposes of illustrating the interaction between the different power levels available according to an embodiment, consider a portable platform such as an Ultrabook™ computer. In this platform, assume that PL1 is set to 15 watts (W) and PL2 is set between approximately 20-25 W. In turn, EDP or IccMax may be set at 50 W. In this example, the PL3 value may be set between approximately 35-40 W. Thus in many embodiments, the PL3 value may be limited to approximately 75% of IccMax.

Furthermore, understand that while in general the PL1 and PL2 thresholds may remain fixed throughout system operation, the PL3 threshold may vary based on platform conditions. This is so as this threshold and the power envelope control described herein are used to protect platform power delivery components, more so than for purposes of protecting the processor itself. Thus based on the level of charge available in the platform or the overall platform power requirements (e.g., as dictated based on the number of active and available devices in the system), the PL3 value may dynamically change during system operation, and can possibly drop below the PL2 threshold in some cases. Also understand that these example values are for purposes of illustration and embodiments may provide for a variety of power level thresholds having different values (and potentially greater or fewer thresholds).

Referring now to FIG. 1, shown is a block diagram of a portion of a system in accordance with an embodiment of the present invention. As shown in FIG. 1, system 100, which may be a small form factor device, includes various components, including a processor 110 which as shown is a multi-core processor. Processor 110 may be coupled to a power supply 150 via an external voltage regulator 160, which may perform a first voltage conversion to provide a primary regulated voltage to processor 110. Understand that additional power delivery components are present but not shown in FIG. 1 so as to not obscure the details described here.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In various embodiments, a processor may include multiple domains, each formed of a collection of hardware and/or logic that operates at the same voltage and frequency. In the embodiment of FIG. 1, each core and certain related circuitry (e.g., including a cache memory or portions of a distributed cache memory and associated logic) may be an independent domain.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include logic to receive and store power envelope information, and use this information in constraining the processor to operate below a defined peak power level (e.g., as defined in the power envelope information). In this way, a processor is still allowed to exceed a long term maximum power level, at least for limited times and frequencies in a system having a smaller power delivery system than other systems in which the processor can be equally incorporated.

While not shown for ease of illustration, understand that additional components may be present within processor 110 such as one or more independent graphics domains, uncore logic, and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the peak power envelope constraining described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

In different embodiments, a power envelope definition may include a plurality of parameters that can be configured, e.g., by a platform OEM. To this end the power envelope definition may be implemented as a set of configurable parameters that can be customized for a given platform, e.g., within basic input/output system (BIOS) or other system software, and which may be communicated to the processor on power up. In one embodiment, a power envelope includes the following parameters: a safe power level that downstream power delivery components can sustain for infinite duration (referred to herein as "P_safe"); a burst power threshold (referred to herein as "P_burst"); a time window that specifies the time duration over which a monitoring and control cycle occurs; and a duty cycle that specifies a ratio or percentage of bursts allowed during the course of the time window. Of course fewer, additional and different parameters may be present in a given power envelope definition. For example, a power envelope definition can include multiple sets of P_burst thresholds, time windows and duty cycle constraints. As one example, one set of parameters provide a constraint to control to a duty cycle of 10% over a 10 ms window to bursts of 40 W and at the same time another set of parameters provide a constraint to control to bursts of 30 W over a 100 ms time window with a duty cycle constraint of 30%.

Note that processor power consumption above the burst power threshold is defined as a burst. Particularly because embodiments may be implemented in a small form factor device, the power delivery components can only sustain power levels above this burst power threshold for short durations; additionally, these components cannot sustain frequent bursts above the burst power level. While platforms take many different forms and can have different requirements in this regard, in some embodiments the bursts may be limited to between approximately 5 and 100 milliseconds (ms). And in such examples, the duty cycle may be between approximately 5 and 50% to ensure that too frequent bursts above the burst power threshold are prevented.

Embodiments thus monitor processor power consumption over time and ensure that bursts above the burst power threshold do not violate the programmed duty cycle requirement over the programmed time window. The duty cycle and the time window constraints thus may be used to determine the maximum allowed residency duration at or above the burst power threshold. Once this constraint is met, power management actions are taken so that the processor power consumption level does not exceed P_safe over the remainder of the time window.

To communicate power envelope information to a processor, embodiments provide an interface, which in some embodiments may be a register-based software interface, to enable system software or another platform component to communicate the power envelope information to the processor. As several examples, a microcontroller of a platform such as an embedded controller (EC), a system management controller (SMC), a base motherboard controller (BMC), a power management integrated circuit (PMIC) or other microcontroller, or in band software (e.g., BIOS or other system software such as an OS) can communicate the operating power envelope constraints to the processor. In the case of these non-software platform agents (namely a microcontroller or other separate component), communication may be via an out of band interface such as platform environment control interface (PECI) to enable sideband communication of various environmental and other information without affecting a primary communication path used by application/OS communications. And, via this sideband or out of band path, a guaranteed response time can be realized as OS operation does not impact the power communications here.

Note further that in addition to configuring a power envelope register with power envelope information on startup of a platform, dynamic reconfiguration of the power envelope register may occur during normal operation. This is particularly case for a portable device that is operating on battery power. That is, as a battery discharges such that it stores less charge, one or more of the power envelope parameters can be dynamically adjusted (e.g., downward with respect to the power burst threshold) to maintain safe operation in this reduced capacity case. Embodiments may further dynamically reconfigure one or more of the power envelope parameters based on other platform environmental conditions such as platform temperature, insertion/removal of one or more peripheral devices and so forth.

Figure 2:
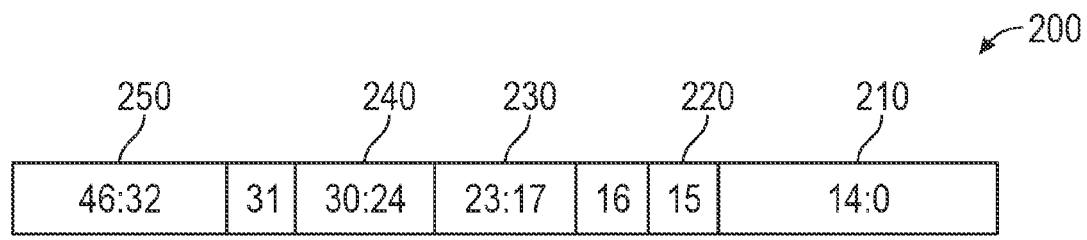
FIG. 2 is a block diagram of a register in accordance with one embodiment of the present invention.

Referring now to FIG. 2, shown is a block diagram of a register, which may be a model specific register (MSR) located in configuration space of a processor (in some embodiments, this register may be located within logic of a PCU). When the interface is a MSR, an in band platform management driver (e.g., of BIOS) may access the register to set up operating power envelope constraints. In another embodiment, this register can receive information mirrored from an out of band register space (such as via a PECI), either located within a processor package or in a chipset component (such as a peripheral controller) coupled to the processor. This out of band register space may be accessed by an embedded platform controller to specify the operating power envelope constraints, which can then be mirrored to the MSR. One embodiment can include supporting multiple MSR registers, a subset of which are configured via in-band platform management drivers such as BIOS and the rest configured via out of band methods such as through embedded platform controllers like an SMC. This allows the ability for different platform management entities to specify operating power envelopes to protect different power delivery components. For example, the SMC may specify an operating envelope to protect the battery while BIOS may specify a constraint to protect the external voltage regulator.

In the embodiment of FIG. 2, register 200 is a 64-bit register having a plurality of fields through which different parameters of the desired power envelope constraints can be specified. As shown in FIG. 2, register 200 includes a plurality of fields 210-250. Each of these fields may store a given power envelope parameter. In the particular example shown, field 210 stores a P_burst power limit, field 220 stores an enable control indicator, field 230 stores a time window, field 240 stores a duty cycle, and field 250 stores a P_safe power limit.

In an embodiment, the P_burst power limit may be expressed in units of watts or milliwatts, based on the range appropriate for a given platform. In an embodiment, the enable control indicator may be set to a logic one when power envelope and duty cycle control actions are enabled and set to a logic zero when no power envelope-based control actions are desired. In an embodiment, the time window may be expressed in terms of milliseconds (or any other time units appropriate for a given platform). In an embodiment, the duty cycle may be expressed as a percentage number between 0 and 100%. Finally, in an embodiment the P_safe power limit may be expressed in units of watts or milliwatts.

Although shown with these particular fields in the embodiment of FIG. 2, understand that more, fewer, or different fields may be present in other embodiments. For example, in one embodiment the P_safe power field can be omitted with an implicit assumption that controlling processor power to fall below the P_burst power threshold is a sufficient mitigation option. This assumption means the power delivery system is capable of sustaining a P_burst power level for infinite duration.

Using the information provided via a power envelope register such as that of FIG. 2, embodiments may perform power control to enable bursts of power greater than a given threshold level, but to constrain processor power consumption to be maintained within power envelope constraints. In this way, desired responsiveness may be achieved without harming power delivery components of a platform. In general, a power control algorithm may be executed, e.g., via hardware, software, firmware or combinations thereof such as implemented within logic of a processor such as a power envelope control logic of a PCU of the processor, to enforce power constraints using the information in a power envelope register or other storage for power envelope constraint information.

In one embodiment, a power control algorithm may first, for each periodic interval, sample the power consumed by the processor over the previous interval. Note that the length of the interval may vary in different embodiments. In general, this periodic interval may be selected based on how quickly a processor's power consumption information can be gathered or based on over what time scale power limiting actions are desired by the platform and downstream power delivery components.

Based on this power consumption information (which in an embodiment may be a total power consumption level of a processor, e.g., in terms of watts or milliwatts), next the processor may perform one or more calculations to determine whether the power consumed over the previous evaluation interval exceeds a given threshold, e.g., the P_burst threshold. If it is determined that the power consumption in the previous evaluation interval does exceed this threshold, an indication regarding this first interval power violation may be maintained. For example, in an embodiment, an indicator may correspond to a bit within a register or other buffer such as a first in first out (FIFO) buffer that acts as a sliding window. In an embodiment, the size of the buffer, referred to herein as a violation history buffer, may be based on the time window specified and the number of periodic samples over that time window. For example if the time window is set to 30 ms and the evaluation interval is 1 ms, the buffer may be sized to have a width of 30 bits. In an embodiment, each bit of the buffer may have a value of logic zero or logic one. In one implementation, a logic one indicates that the processor power consumption over the corresponding evaluation interval exceeded the burst power threshold. And correspondingly, a logic zero indicates that the power consumption over the corresponding evaluation interval did not exceed the burst power threshold.

Figure 3:
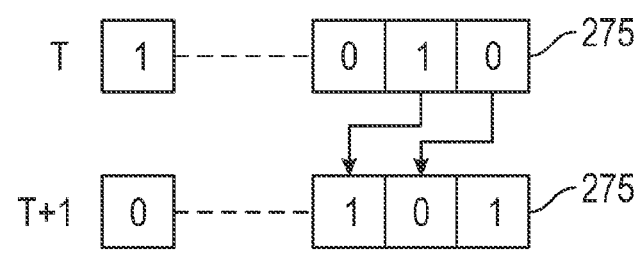
FIG. 3 is an illustration of buffer operation in accordance with one embodiment.

Referring now to FIG. 3, shown is an illustration of buffer operation in accordance with one embodiment. As seen in FIG. 3, at a first time instance T, buffer 275 has a most significant bit value of logic one, indicating that at a prior evaluation interval (namely the $n^{th}$ prior evaluation interval, where the buffer is n bits wide), the power consumption level of the processor violated the burst power threshold. And as seen at the least significant bit corresponding to time instance T, no violation occurred.

FIG. 3 further illustrates that at a next time instance T+1, the value of buffer 275 changes such that all bits are shifted one place to the left. Here, the value of logic one in the least significant bit indicates that the power consumption exceeded the burst power threshold at this time instance T+1. And further note that at the most significant bit, the change in value shows that that violation at time instance T+n pops out of the buffer.

Based on the information in this buffer, a determination may be made as to whether the processor is allowed to exceed the burst power threshold during one or more future evaluation intervals. In one embodiment, a pop count on the buffer may be performed, which generally corresponds to a count of the number of bits set to a value of logic one in the buffer. Using this information and a maximum allowable threshold count (generally corresponding to a maximum allowable number of burst threshold violations), processor power management determinations may be made. In an embodiment, the maximum allowable number of violations possible may be derived using the programmed time window and the duty cycle. For example if the time window is 30 ms and the programmed duty cycle is 20%, the maximum number of allowed bursts above P_burst is 20%*30 ms=6. This means that the processor is allowed to burst above P_burst for a total of 6 ms over that 30 ms window.

In various embodiments, this 6 ms can be spread apart in any way over the 30 ms time window. This limit of the maximum number of violations over the configured time window is referred to herein as a strike limit. If the number of logic ones in the buffer equals or exceeds this allowable strike limit, a power controller of the processor such as a PCU may constrain a maximum operating frequency of the processor to a limit where, no matter what workload begins execution, the power consumed by the processor never exceeds the P_safe threshold power limit. Instead if the number of violations in the buffer is less than the allowable strike limit, no power constraint is called for (other than EDP), and thus the PCU may allow operation of the processor to continue at a current operating frequency, e.g., as requested by software such as an OS.

Figure 4:
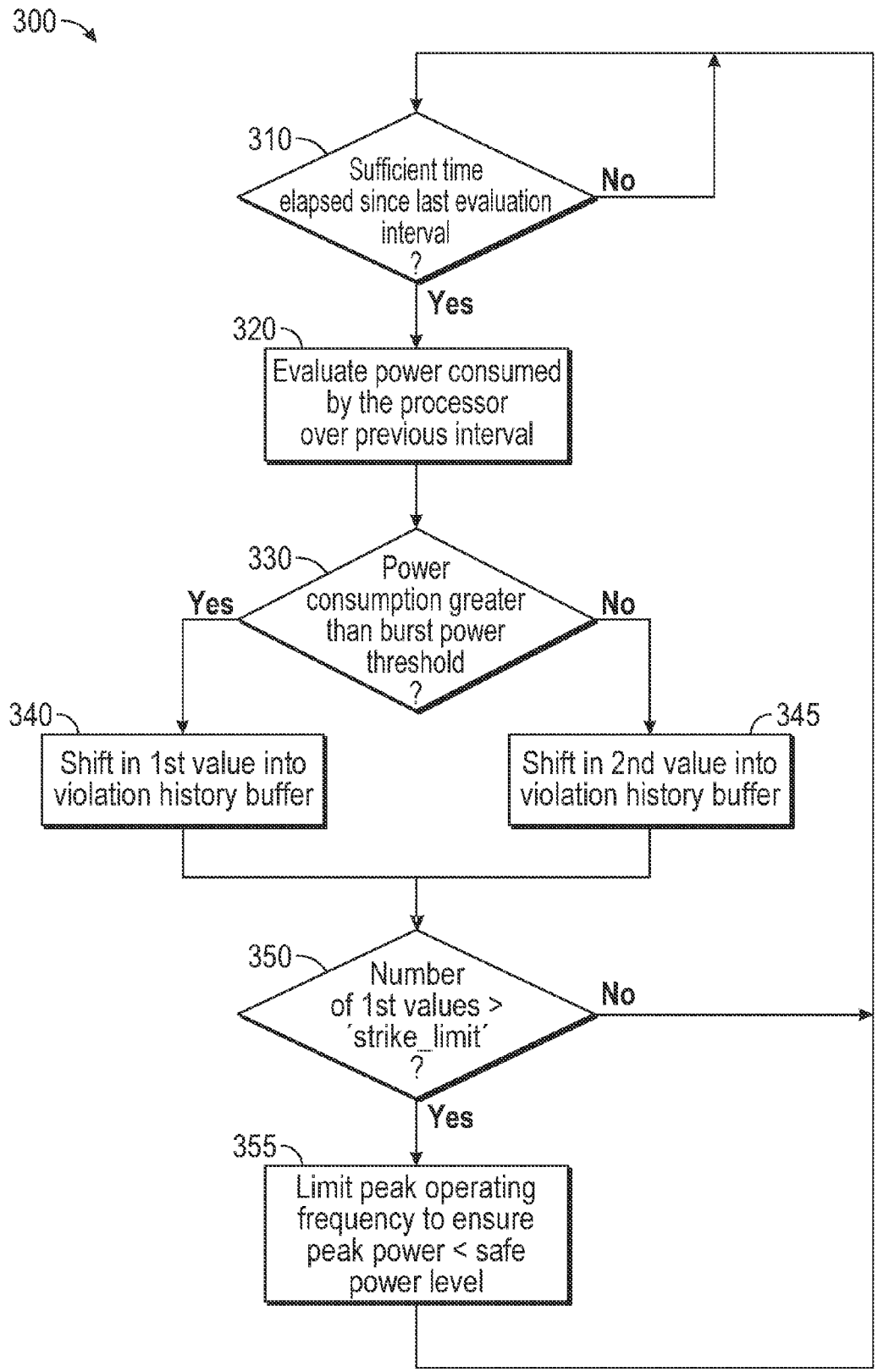
FIG. 4 is a flow diagram of a method in accordance with an embodiment of the present invention.

Referring now to FIG. 4, shown is a flow diagram of a method in accordance with an embodiment of the present invention. Method 300 may be used to perform power envelope-based power constraining in accordance with an embodiment. As one example, method 300 may be performed by logic within a power controller such as a PCU. However understand that in other embodiments, other hardware, software and/or firmware may be used to perform all or portions of method 300.

As seen in FIG. 4, method 300 begins by determining whether a sufficient time has elapsed since a last evaluation interval (block 310). In an embodiment, this evaluation interval may be a processor-configured periodic interval determined based on how quickly power consumption information can be gathered or a duration in which power limiting actions are appropriate for the platform and downstream power delivery components. In one example embodiment, this evaluation interval may be 1 ms.

Next a power consumption level may be determined (block 320). More specifically, the power consumed by the processor over the prior evaluation interval may be determined. This determination may thus indicate a power consumption level, e.g., in watts or milliwatts, of the processor. Next at diamond 330 it is determined whether this power consumption is greater than a burst power threshold. Note that this burst power threshold may be one of the power envelope parameters provided to the processor from a platform entity.

If it is determined that the power consumption level is greater than the burst power threshold, control passes to block 340 where a first value is shifted into a violation history buffer. In an embodiment, this first value may be a logic one that is inserted into the least significant bit of the buffer after the contents of the buffer are shifted left by a bit. Otherwise, when it is determined that the power consumption level is less than the burst power threshold, control passes to block 345 where a second (e.g., logic zero) value is shifted into the least significant bit of the violation history buffer.

In either case, control passes to diamond 350 where it is determined whether the number of first values exceeds a strike limit, namely a threshold of permitted bursts. If not, analysis for a current evaluation interval is completed and control passes back to diamond 310 for beginning of the loop again for a next evaluation interval. Instead if the number of first values does exceed the strike limit, control passes to block 355. At block 355, one or more appropriate power management actions may take place. As one example, a peak operating frequency of the processor (e.g., the overall processor) may be limited to ensure that peak power consumption is less than a safe power level. Note that in an embodiment this safe power level also may be provided as a parameter of the power envelope parameters.

Of course other power management actions are possible in other embodiments. For example, instead of reducing the overall operating frequency, the maximum operating frequency of one or more domains of the processor may be limited. And in other embodiments, additional or different power management actions such as lowering the bandwidth of a given compute domain, e.g., to the memory hierarchy, may occur. As one such example, in a multi-domain processor including one or more core domains, one or more graphics domains, and a capture device domain (e.g., a video camera), the core domain may be power managed using DVFS. While similar power management control is possible for the other domains, in some embodiments more efficient power management may be effected for such domains by lowering the memory bandwidth allocated to these devices. In an embodiment, this memory bandwidth management may be realized by configuring a memory arbiter, e.g., present in a memory controller of the processor, to throttle or limit the number of memory transactions originating from these domains. Of course in other embodiments still further types of power management actions such as duty cycle control are possible. In duty cycle control, a compute domain is allowed to operate for a certain 'on' duration and is power gated or placed in an idle state for an 'off' duration. The ratio of the 'on' duration to the total duration results in the power consumed by that domain. Although shown at this high level in the embodiment of FIG. 4, understand the scope of the present invention is not limited in this regard.

As discussed above, in various embodiments a platform agent may provide the processor with the power envelope parameters via a selected interface to enable the processor to store and use these parameters during power management operations in accordance with an embodiment. These platform agents vary in different embodiments and can range from separate components of a platform such as standalone integrated circuit components, e.g., a microcontroller such as an embedded controller, a power management IC or other type of microcontroller, to an agent that executes on another component such as a peripheral controller or other device that performs operations on behalf of system software such as BIOS or an OS.

Figure 5:
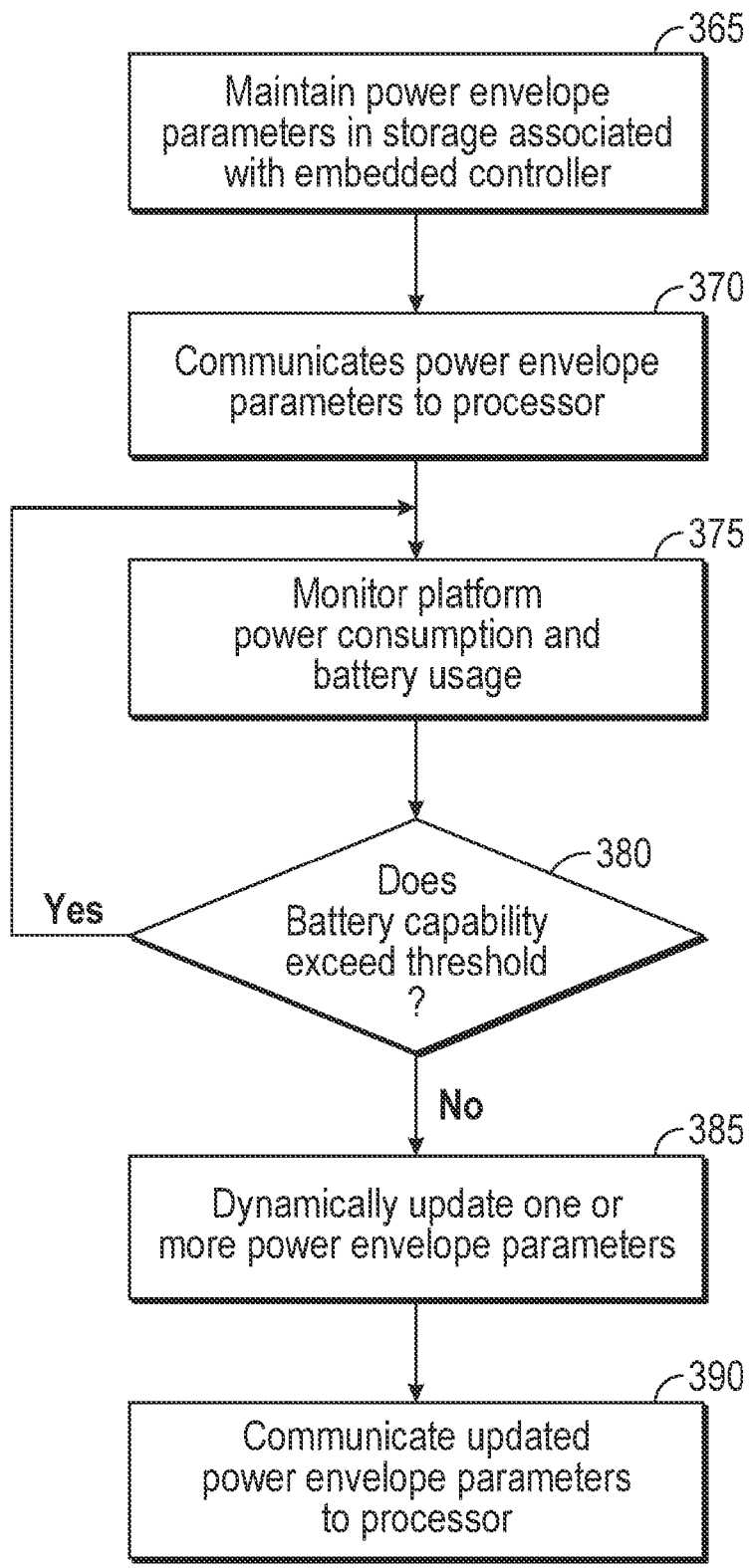
FIG. 5 is a flow diagram of a method for providing power envelope parameters in accordance with an embodiment of the present invention.

For purposes of discussion, assume that the platform agent is an embedded controller that is a standalone component of the platform such as affixed to a motherboard of the platform. Referring now to FIG. 5, shown is a flow diagram of a method for providing power envelope parameters in accordance with an embodiment of the present invention. As shown in FIG. 5, method 360 may be performed by logic of an embedded controller or other platform agent that is to program a set of power envelope parameters into a processor as described herein.

As seen, method 360 begins by maintaining power envelope parameters in a storage associated with the embedded controller (block 365). As an example, the embedded controller or other controller may be programmed by an OEM with a given set of power envelope parameters for a particular platform in which a processor is to be included. In an embodiment, these power envelope parameters may be determined based at least in part on the size and capabilities of downstream power delivery components of the platform. In one embodiment, the power envelope parameters may correspond to the parameters as shown in the fields of the power envelope register of FIG. 2. Of course more, fewer or different parameters may be present in other embodiments.

Next, these power envelope parameters may be communicated to the processor (block 370). In an embodiment, the embedded controller may be coupled to the processor via an out of band communication channel. In this way, low latency communications may occur as these communications remain hidden from an OS executing on the system. These power envelope parameters may be communicated to the processor, e.g., on system startup. Thus at this point the processor is appropriately configured with these power envelope parameters which may be stored in a power envelope register or another storage of the processor.

Still referring to FIG. 5, during normal system operations platform power consumption may be monitored by the embedded controller. More specifically, at block 375 the power consumption and battery usage may be monitored or estimated. In some embodiments a so-called smart battery may be present in the platform and can provide information regarding its charge level to the embedded controller. As one such example, this charge information may be provided as a percentage of remaining charge. In addition to charge information from the battery (as well as other battery information), the embedded controller may further receive other information regarding power consumption of the platform. For example, various components of the platform including the processor, one or more memories, one or more peripheral devices and so forth may communicate information regarding their power consumption and/or activity level. With this information, the controller may thus monitor or estimate power consumption and battery usage.

Based on all of this information, it can be determined whether the battery capability exceeds a given threshold (diamond 380). For example, dependent upon the level of charge remaining in the battery (and assuming that the platform is in fact operating on battery power) the embedded controller may determine whether a battery capability exceeds a threshold level, e.g., corresponding to a power consumption level such as a peak power requirement of the processor. If so no further action is taken and control may pass back to block 375 for further monitoring of platform conditions.

Otherwise if the battery capability does not exceed the threshold, control instead passes to block 385 where one or more power envelope parameters may be dynamically updated. For example, the embedded controller may reduce the burst power threshold so that the processor is not allowed to operate at such high burst power levels, potentially reducing power consumption and thus saving battery capacity.

To enable the processor to effect such changes, at block 390 the updated power envelope parameters may be communicated to the processor. As such, the processor may update one or more values stored in the power envelope register or other storage. And, the PCU may use these updated values for further power management actions. Although shown at this high level in the embodiment of FIG. 5 and with the example of an embedded controller, understand the scope of the present invention is not limited in this regard and understand that other platform agents may be involved in the power envelope communications and updates described herein.

Figure 6:
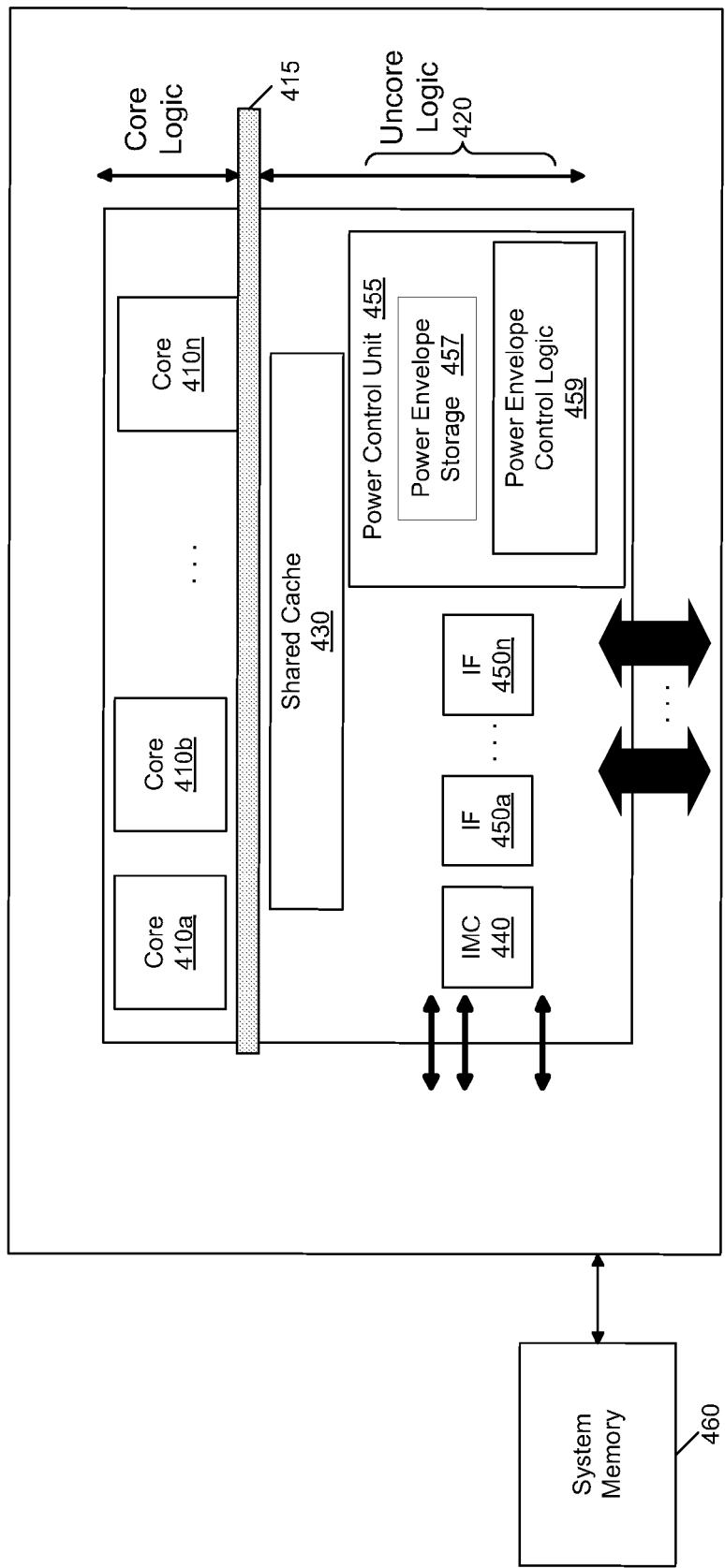
FIG. 6 is a block diagram of a processor in accordance with an embodiment of the present invention.

Embodiments can be implemented in processors for various markets including server processors, desktop processors, mobile processors and so forth. Referring now to FIG. 6, shown is a block diagram of a processor in accordance with an embodiment of the present invention. As shown in FIG. 6, processor 400 may be a multicore processor including a plurality of cores $410a$-$410n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In various embodiments, power control unit 455 may include a power envelope control logic 459 in accordance with an embodiment of the present invention. As seen, PCU 455 further includes a power envelope storage 457, which may be implemented as a MSR. In an embodiment, storage 457 may be included within logic 459. Using this logic 459, a power consumption level of the processor may be allowed to exceed a burst power threshold for at least portions of a time window, as configured using information stored in storage 457.

With further reference to FIG. 6, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 6, the scope of the present invention is not limited in this regard.

Figure 7:
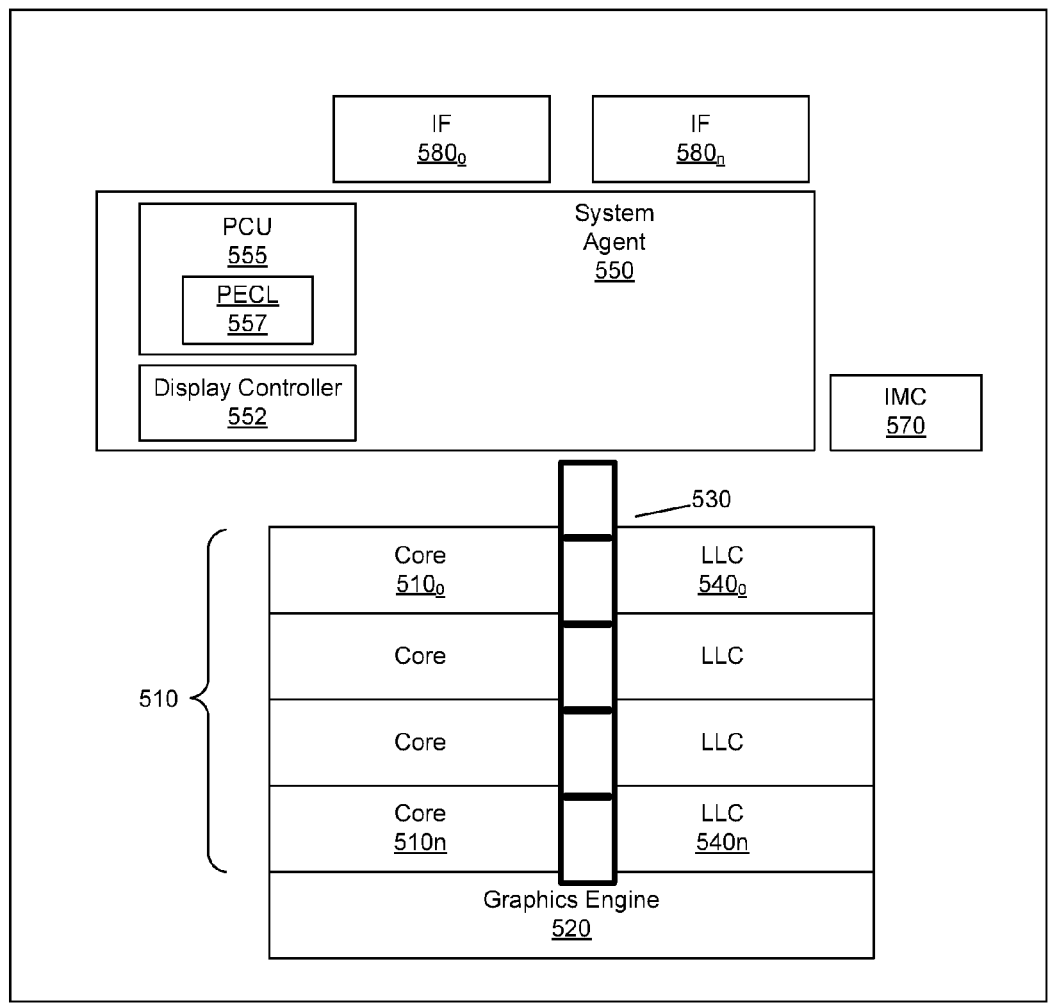
FIG. 7 is a block diagram of a multi-domain processor in accordance with another embodiment of the present invention.

Referring now to FIG. 7, shown is a block diagram of a multi-domain processor in accordance with another embodiment of the present invention. As shown in the embodiment of FIG. 7, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a power envelope control logic 559 in accordance with an embodiment of the present invention (which itself may include a power envelope register 557) to dynamically constrain processor power consumption to not exceed a power burst threshold for more than a configured number of time-controlled bursts within a time window. In various embodiments, this logic may execute the algorithm described above in FIG. 4.

As further seen in FIG. 7, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 8:
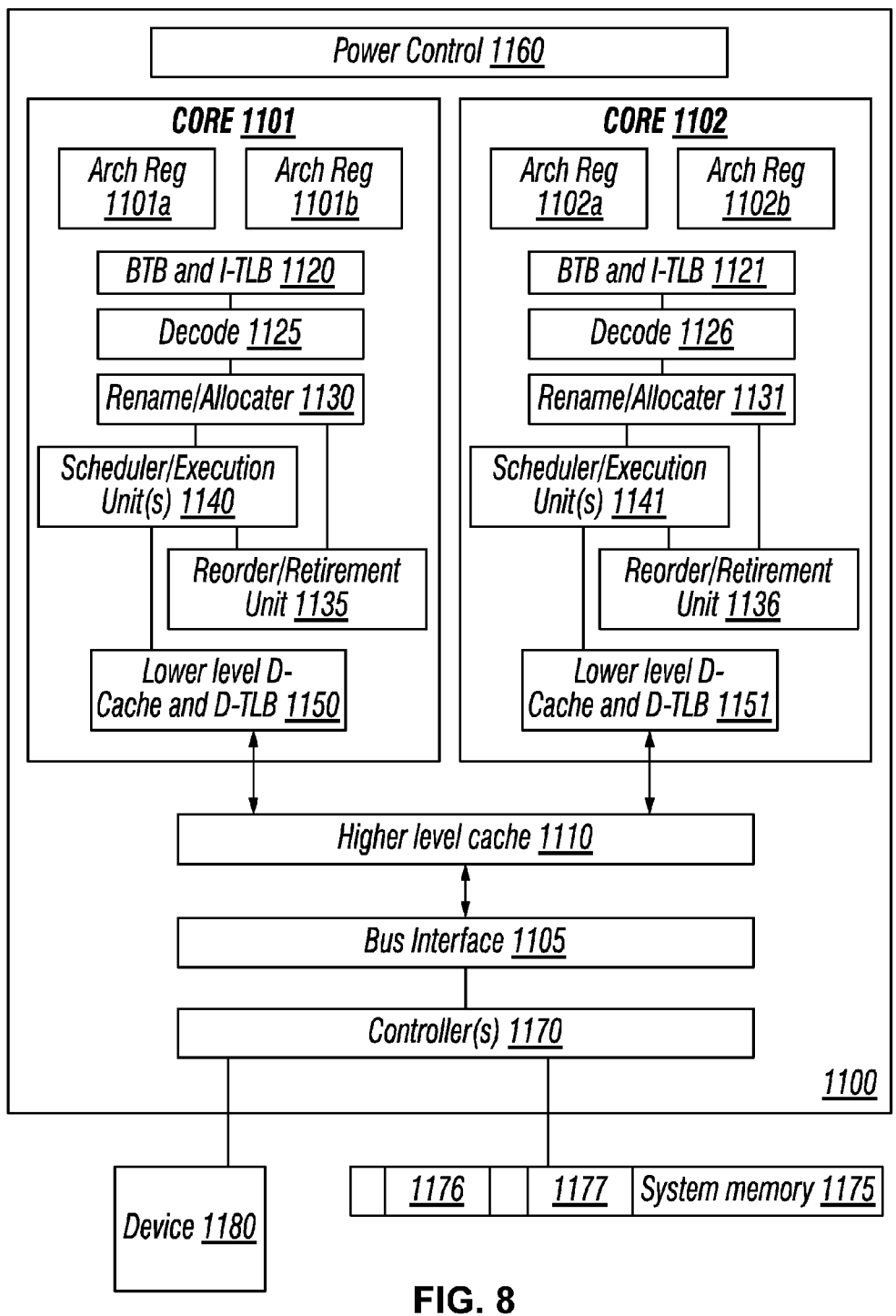
FIG. 8 is a block diagram of a processor including multiple cores in accordance with an embodiment of the present invention.

Referring to FIG. 8, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 8, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101*a* and 1101*b*, which may also be referred to as hardware thread slots 1101*a* and 1101*b*. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above. As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 8, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 9:
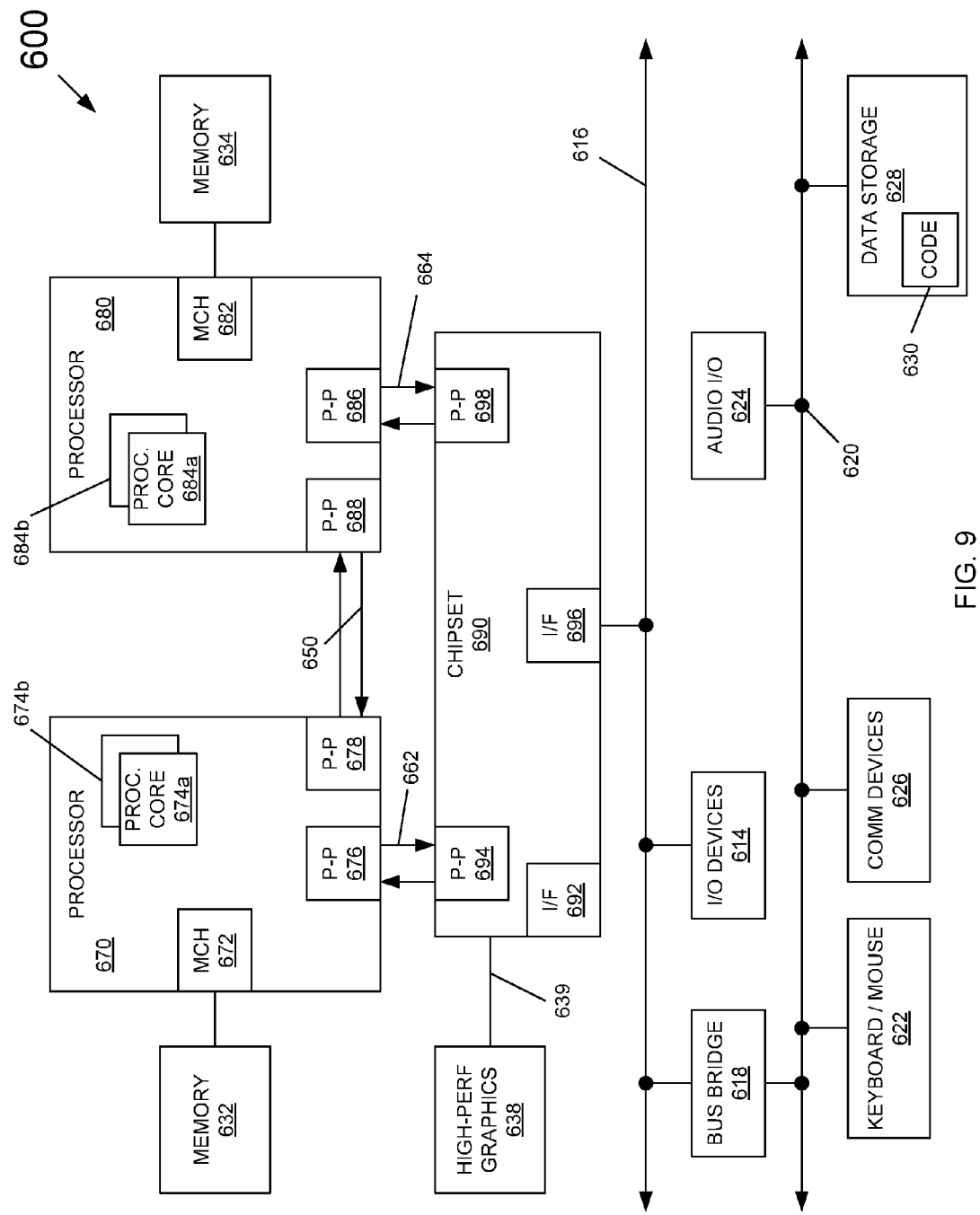
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 600 is a point-to-point interconnect system, and includes a first processor 670 and a second processor 680 coupled via a point-to-point interconnect 650. As shown in FIG. 9, each of processors 670 and 680 may be multicore processors, including first and second processor cores (i.e., processor cores 674$a$ and 674$b$ and processor cores 684$a$ and 684$b$), although potentially many more cores may be present in the processors. Each of the processors can include a PCU or other logic to constrain processor power consumption according to values stored in a power envelope storage and which may be dynamically adjusted based on system environmental parameters (e.g., available battery charge) as described herein.

Still referring to FIG. 9, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 9, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 9, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 10:
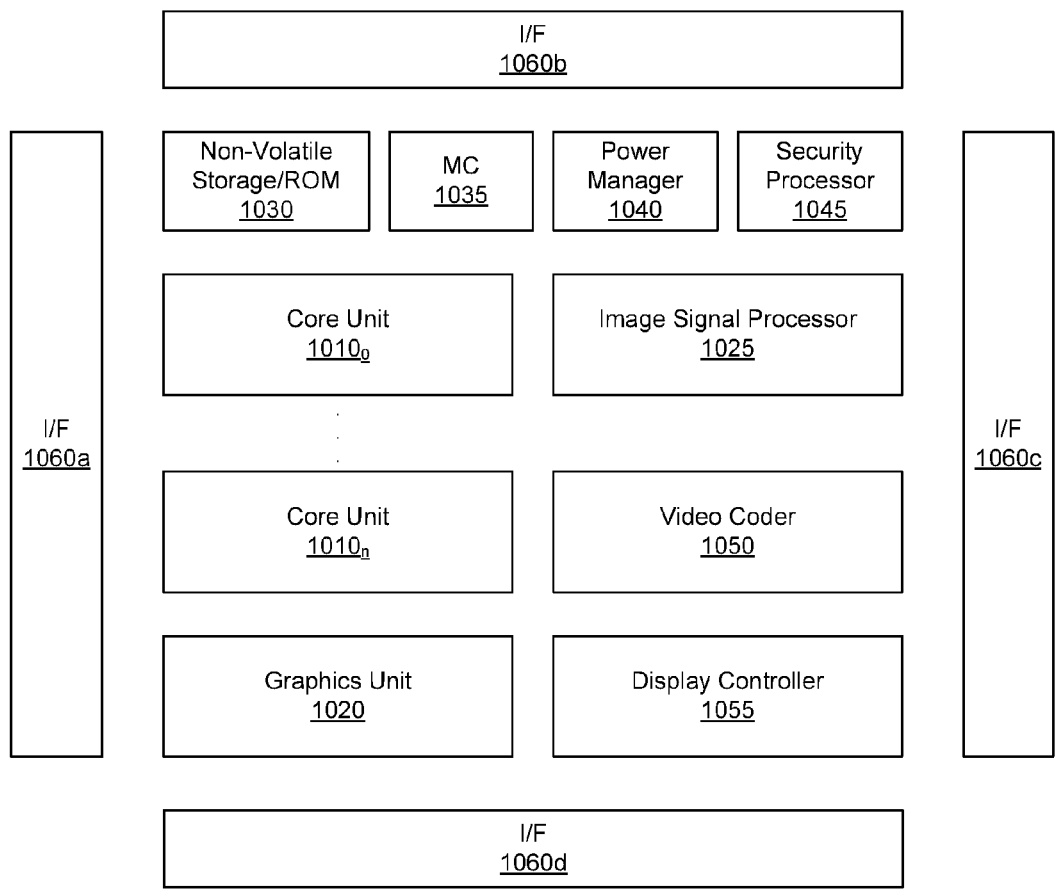
FIG. 10 is a block diagram of a processor in accordance with another embodiment of the present invention.

Referring now to FIG. 10, shown is a block diagram of a processor in accordance with another embodiment of the present invention. In the embodiment of FIG. 10, processor 1000 may be a system on a chip (SoC) including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 10, processor 1000 includes a plurality of core units 1010$_0$-1010$_n$. Each core unit may include one or more processor cores, one or more cache memories and other circuitry. Each core unit 1010 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a dynamic random access memory (DRAM) (not shown for ease of illustration in FIG. 10).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip. Other accelerators also may be present. In the illustration of FIG. 10, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth.

Each of the units may have its power consumption controlled via a power manager 1040. Power manager 1040 includes control logic to perform power envelope-based power consumption control according to power envelope parameters dictated by an OEM.

In some embodiments, SoC 1000 may further include a non-coherent fabric coupled to the coherent fabric to which various peripheral devices may couple. One or more interfaces 1060a-1060d enable communication with one or more off-chip devices. Such communications may be according to a variety of communication protocols such as PCIe™ GPIO, USB, I2C, UART, MIPI, SDIO, DDR, SPI, HDMI, among other types of communication protocols. Although shown at this high level in the embodiment of FIG. 10, understand the scope of the present invention is not limited in this regard.

Figure 11:
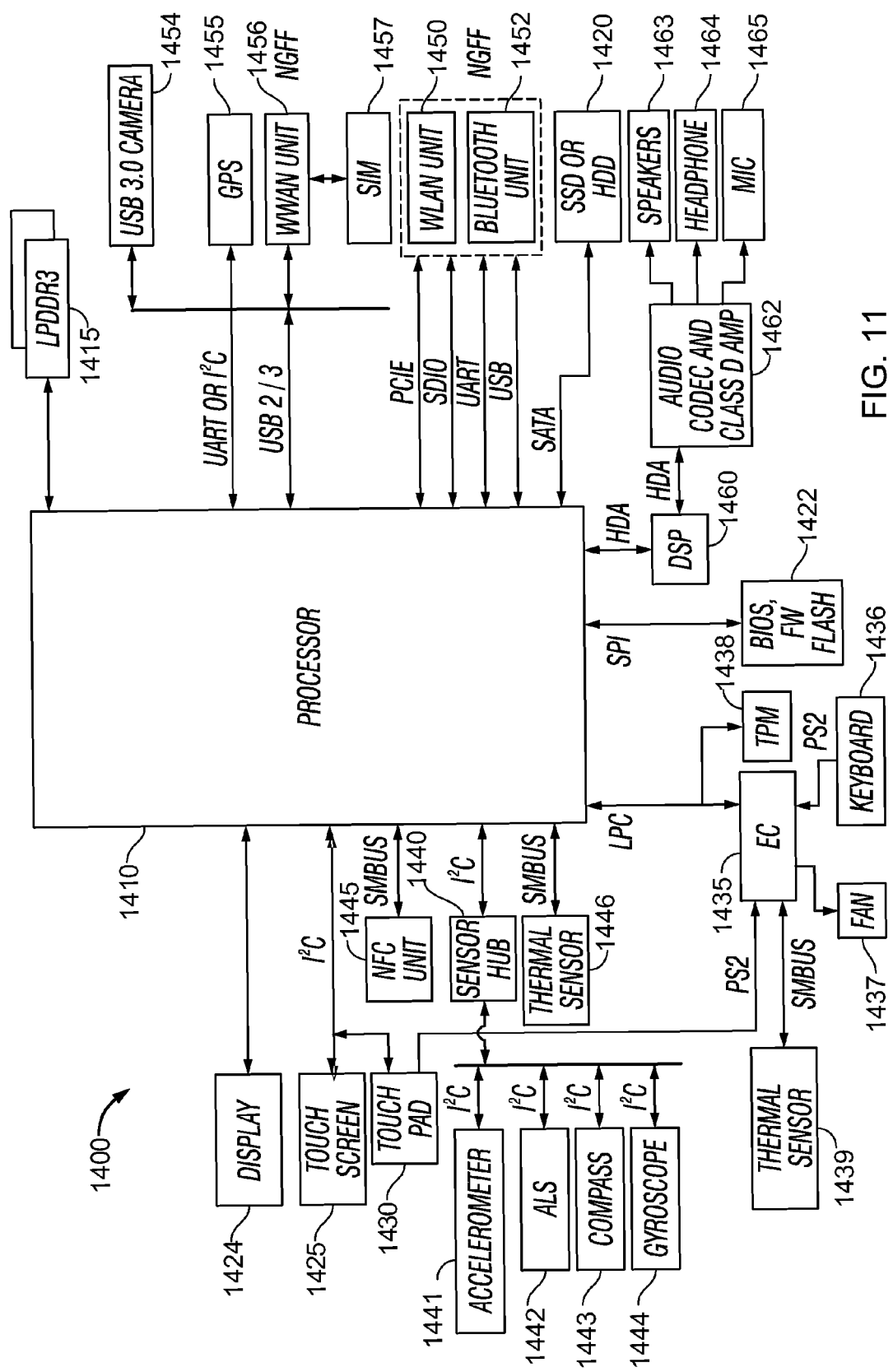
FIG. 11 is a block diagram of components present in a computer system in accordance with an embodiment of the present invention

Referring now to FIG. 11, a block diagram of components present in a computer system in accordance with an embodiment of the present invention. As shown in FIG. 11, system 1400 may include any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 11 is intended to show a high level view of many components of the computer system. However, it is to be understood that some of the components shown may be omitted, additional components may be present, and different arrangement of the components shown may occur in other implementations.

As seen in FIG. 11, a processor 1410, in one embodiment, includes a microprocessor, multi-core processor, multi-threaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as SoC. As a specific illustrative example, processor 1410 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or TI OMAP processor. Certain details regarding the architecture and operation of processor 1410 in one implementation will be discussed further below.

Processor 1410, in one embodiment, communicates with a system memory 1415. As an illustrative example, the system memory 1415 is implemented via multiple memory devices or modules to provide for a given amount of system memory. In one embodiment, the memory is operable in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. As examples, 2/4/8/12/16 gigabytes (GB) of system memory may be present and can be coupled to processor 1410 via one or more memory interconnects. In various implementations the individual memory devices may be of different package types such as single die package (SDP), dual die package (DDP) or quad die package (QDP). These devices, in some embodiments, are directly soldered onto a motherboard to provide a lower profile solution, while in other embodiments the devices are configured as one or more memory modules that in turn couple to the motherboard by a given connector. Other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 11, a flash device 1422 may be coupled to processor 1410, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 400. Specifically shown in the embodiment of FIG. 11 is a display 1424 which may be a high definition LCD or LED panel configured within a lid portion of the chassis. This display panel may also provide for a touch screen 1425, e.g., adapted externally over the display panel such that via a user's interaction with this touch screen, user inputs can be provided to the system to enable desired operations, e.g., with regard to the display of information, accessing of information and so forth. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I2C interconnect. As further shown in FIG. 11, in addition to touch screen 1425, user input by way of touch can also occur via a touch pad 1430 which may be configured within the chassis and may also be coupled to the same I2C interconnect as touch screen 1425.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920× 1080p), be compatible with an embedded display port (eDP), and be a low power panel with panel self refresh.

For perceptual computing and other purposes, various sensors may be present within the system and may be coupled to processor 1410 in different manners. Certain inertial and environmental sensors may couple to processor 1410 through a sensor hub 1440, e.g., via an I2C interconnect. In the embodiment shown in FIG. 11, these sensors may include an accelerometer 1441, an ambient light sensor (ALS) 1442, a compass 1443 and a gyroscope 444. Other environmental sensors may include one or more thermal sensors 1446 which in some embodiments couple to processor 1410 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

Also seen in FIG. 11, various peripheral devices may couple to processor 1410 via a low pin count (LPC) interconnect. In the embodiment shown, various components can be coupled through an embedded controller (EC) 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect. However, the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode. In various embodiments EC 1435 may communicate power envelope parameters to a PCU or other power control logic in processor 1410 to enable configurable and dynamic constraints on power consumption.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1400 can communicate with external devices in a variety of manners, including wirelessly. In the embodiment shown in FIG. 11, various wireless modules, each of which can correspond to a radio configured for a particular wireless communication protocol, are present. One manner for wireless communication in a short range such as a near field may be via a near field communication (NFC) unit 1445 which may communicate, in one embodiment with processor 1410 via an SMBus. Note that via this NFC unit 1445, devices in close proximity to each other can communicate. For example, a user can enable system 1400 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 11, additional wireless units can include other short range wireless engines including a WLAN unit 1450 and a Bluetooth unit 1452. Using WLAN unit 1450, Wi-Fi™ communications in accordance with a given Institute of Electrical and Electronics Engineers (IEEE) 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 11, WWAN unit 1456 and an integrated capture device such as a camera module 1454 may communicate via a given USB protocol such as a USB 2.0 or 3.0 link, or a UART or I2C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. Another additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 11, understand the scope of the present invention is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1410 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1435. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1435 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 11, the scope of the present invention is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. In some embodiments, such PMIC may communicate the power envelope information to processor 1410. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Embodiments thus provide a mechanism through which a platform controller or other system agent can configure (among other power envelope parameters) a power limit, time window and duty cycle over which the processor controls its power consumption. Thus in addition to controlling the maximum duration of a power burst, embodiments also ensure that frequent back-to-back bursts do not occur. While embodiments use a buffer such as a FIFO to track history of power bursts (and thus consider past behavior) in determining whether to constrain current peak allowed power consumption, understand that other mechanisms to track past power consumption information and use the same in making power management decisions are possible.

And through this mechanism, a processor can be constrained to operate within a power envelope that the platform can handle. This technique enables a platform designer to optimally size power delivery components of the platform to support long term average usage models and still allow at least a limited burst capability within what the components can handle, instead of sizing the power delivery components to always support peak burst powers. Accordingly, power delivery components in a small form factor device may be smaller sized, which may enable inclusion of an advanced processor that provides a desired responsiveness while at the same time operating within the constraints of a power delivery system of the device.

The following examples pertain to further embodiments.

In one example, a processor includes at least one core to execute instructions and a power controller coupled to the core. The power controller may include a power envelope control logic to receive a plurality of power envelope parameters and to enable a power consumption level of the processor to exceed a power burst threshold for a portion of a time window. This portion may be determined according to the time window and a duty cycle, where the power envelope parameters are programmed for a system including the processor and include the power burst threshold, the time window, and the duty cycle.

In an example, the power controller includes a power envelope storage to store the plurality of power envelope parameters. This power envelope storage may be written responsive to a communication of the power envelope parameters from system software. The power envelope storage may be written responsive to a communication of the power envelope parameters from an embedded controller coupled to the processor via an out of band communication path.

In an example, a history buffer includes a plurality of bits each to store a first value to indicate that the power consumption level exceeds the power burst threshold during an evaluation interval or a second value to indicate that the power consumption level does not exceed the power burst threshold during the evaluation interval. In one example, the history buffer comprises a FIFO buffer in which a first significant bit corresponds to a most recent evaluation interval and a last significant bit corresponds to a least recent evaluation interval. The power envelope control logic may shift contents of the FIFO buffer towards the last significant bit and to store the first value or the second value for the most recent evaluation interval into the first significant bit. The history buffer may have a bit width based on the time window and the evaluation interval.

In an example, the power envelope control logic is to count the number of bits of the history buffer having the first value and to determine whether the number of bits having the first value exceeds a threshold value.

In an example, the power controller may constrain the power consumption level of the processor if the number of bits having the first value exceeds the threshold value.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a machine-readable medium having stored thereon instructions, which if performed by a machine cause the machine to perform a method comprising: tracking a history of power bursts by a processor during a time window, where a power burst corresponds to a power consumption level of the processor that exceeds a power burst threshold; and controlling the power consumption level of the processor for a current time interval based on the history, to control a maximum duration of a power burst and a frequency of power bursts.

In an example, method further includes evaluating power consumed by the processor over a previous evaluation interval; shifting a first value into a violation history buffer if the power consumed is greater than the power burst threshold, otherwise shifting a second value into the violation history buffer; and limiting a peak operating frequency of the processor for a current evaluation interval if a number of first values in the violation history buffer is greater than a threshold amount.

In an example, the method further comprises enabling the power consumption level to exceed the power burst threshold for a portion of the time window. In an example, the method further comprises receiving and storing the time window, the duty cycle and the power burst threshold in a storage of the processor. In one example, the time window, the duty cycle, and the power burst threshold may be received via an out of band communication with an embedded controller of the system.

In another example, a computer readable medium including instructions is to perform the method of any of the above examples.

In another example, an apparatus comprises means for performing the method of any one of the above examples.

In another example, a system includes a processor having at least one core, a power controller to control power consumption of the processor, and a power envelope register to store a plurality of power envelope parameters. The power controller may enable the processor to exceed a power burst threshold for a portion of a time window. The power envelope parameters may comprise the power burst threshold and the time window, and where the power controller is further to prevent the processor from exceeding the power burst threshold based at least in part on first history information stored in a history buffer. In addition, a controller may be coupled to the processor to communicate at least a portion of the plurality of power envelope parameters to the processor.

In an example, the controller is coupled to the processor via an out of band interface.

In another example, an apparatus comprises a controller including a logic to communicate a plurality of power envelope parameters to a multicore processor coupled to the controller, the plurality of power envelope parameters configured by an OEM of a platform including the processor and the controller. The plurality of power envelope parameters include a power burst threshold, a time window, and a duty cycle, in an embodiment. The power burst threshold may correspond to a power level that the processor is allowed to exceed for a portion of the time window, based at least in part on the duty cycle.

In an example, the logic is to update at least the power burst threshold based on a remaining charge capacity of a battery of the platform and to communicate the updated power burst threshold to the processor. Note that the power envelope parameters may be configured to ensure that one or more power delivery components of the platform are to operate at a safe level when the processor exceeds the power burst threshold for the portion of the time window.

In an example, the controller is coupled to the processor via a platform environment control interface. The controller may be selected from one of an embedded controller, a system management controller, a base motherboard controller, and a power management integrated circuit.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   at least one core to execute instructions;
   a power controller coupled to the at least one core, the power controller including a power envelope control logic to receive a plurality of power envelope parameters and to enable a power consumption level of the processor to exceed a power burst threshold for a portion of a time window, the portion determined according to the time window and a duty cycle, wherein the plurality of power envelope parameters include the power burst threshold, the time window, and the duty cycle, the power burst threshold less than an electrical design point power level and greater than a thermal design point power level; and
   a history buffer including a plurality of bits each to store a first value to indicate that the power consumption level exceeded the power burst threshold during an evaluation interval or a second value to indicate that the power consumption level did not exceed the power burst threshold during the evaluation interval, wherein the power envelope control logic is to prevent the power consumption level from exceeding the power burst threshold if a number of the plurality of bits having the first value exceeds a threshold value.

2. The processor of claim 1, wherein the power controller includes a power envelope storage to store the plurality of power envelope parameters.

3. The processor of claim 2, wherein the power envelope storage is to be written responsive to a communication of the plurality of power envelope parameters from system software.

4. The processor of claim 2, wherein the power envelope storage is to be written responsive to a communication of the plurality of power envelope parameters from an embedded controller coupled to the processor via an out of band communication path.

5. The processor of claim 1, wherein the history buffer comprises a first in first out (FIFO) buffer in which a first significant bit corresponds to a most recent evaluation interval and a last significant bit corresponds to a least recent evaluation interval, wherein the power envelope control logic is to shift contents of the FIFO buffer towards the last significant bit and to store the first value or the second value for the most recent evaluation interval into the first significant bit.

6. The processor of claim 1, wherein the history buffer has a bit width based on the time window and the evaluation interval.

7. The processor of claim 6, wherein the power envelope control logic is to count the number of bits of the history buffer having the first value and to determine whether the number of bits having the first value exceeds the threshold value.

8. The processor of claim 7, wherein the power controller is to constrain the power consumption level of the processor if the number of bits having the first value exceeds the threshold value.

9. A non-transitory machine-readable medium having stored thereon instructions, which if performed by a machine cause the machine to perform a method comprising:
tracking a history of power bursts by a processor during a time window, wherein a power burst corresponds to a power consumption level of the processor that exceeds a power burst threshold, the power burst threshold less than an electrical design point power level and greater than a thermal design point power level, comprising:
evaluating power consumed by the processor over a previous evaluation interval; and
shifting a first value into a violation history buffer if the power consumed is greater than the power burst threshold, otherwise shifting a second value into the violation history buffer; and
controlling the power consumption level of the processor for a current time interval based on the history, to control a maximum duration of a power burst and a frequency of power bursts, including limiting a peak operating frequency of the processor for the current time interval if a number of first values in the violation history buffer is greater than a threshold amount.

10. The non-transitory machine-readable medium of claim 9, wherein the method further comprises enabling the power consumption level to exceed the power burst threshold for a portion of the time window.

11. The non-transitory machine-readable medium of claim 10, wherein the time window portion is based on the time window and a duty cycle.

12. The non-transitory machine-readable medium of claim 11, wherein the method further comprises receiving and storing the time window, the duty cycle and the power burst threshold in a storage of the processor.

13. The non-transitory machine-readable medium of claim 11, wherein the method further comprises receiving the time window, the duty cycle, and the power burst threshold via an out of band communication with an embedded controller of the system.

14. A system comprising:
a processor including at least one core, a power controller to control power consumption of the processor, and a power envelope register to store a plurality of power envelope parameters, wherein the power controller is to enable the processor to exceed a power burst threshold for a portion of a time window, the power burst threshold less than an electrical design point power level and greater than a thermal design point power level, the plurality of power envelope parameters comprising the power burst threshold and the time window, the power controller further to prevent the processor from exceeding the power burst threshold based at least in part on first history information stored in a history buffer including a plurality of bits each to store a first value to indicate that a power consumption level of the processor exceeds the power burst threshold during an evaluation interval or a second value to indicate that the power consumption level does not exceed the power burst threshold during the evaluation interval, wherein the power controller is to count the number of bits of the history buffer having the first value, determine whether the number of bits having the first value exceeds a threshold value, and prevent the processor from exceeding the power burst threshold when the number of bits having the first value exceeds the threshold value, at least until an end of the time window; and
a controller coupled to the processor, wherein the controller is to communicate at least a portion of the plurality of power envelope parameters to the processor.

15. The system of claim 14, wherein the controller is coupled to the processor via an out of band interface.

16. The system of claim 14, wherein the history buffer comprises a first in first out (FIFO) buffer in which a first significant bit corresponds to a most recent evaluation interval and a last significant bit corresponds to a least recent evaluation interval, wherein the power controller is to shift contents of the FIFO buffer towards the last significant bit and to store the first value or the second value for the most recent evaluation interval into the first significant bit.

* * * * *